US009311544B2

(12) United States Patent
Haley et al.

(10) Patent No.: US 9,311,544 B2
(45) Date of Patent: Apr. 12, 2016

(54) TELEPROCTOR REPORTS USE OF A VEHICLE AND RESTRICTS FUNCTIONS OF DRIVERS PHONE

(71) Applicants: Jeffrey T Haley, Mercer Island, WA (US); Robert Richmond, Seattle, WA (US)

(72) Inventors: Jeffrey T Haley, Mercer Island, WA (US); Robert Richmond, Seattle, WA (US)

( * ) Notice: Subject to any disclaimer, the term of this patent is extended or adjusted under 35 U.S.C. 154(b) by 90 days.

(21) Appl. No.: 13/975,246

(22) Filed: Aug. 23, 2013

(65) Prior Publication Data
US 2015/0054934 A1 Feb. 26, 2015

Related U.S. Application Data

(60) Provisional application No. 61/728,763, filed on Nov. 20, 2012, provisional application No. 61/693,079, filed on Aug. 24, 2012.

(51) Int. Cl.
*G06K 9/00* (2006.01)
*B60W 50/12* (2012.01)
*B60K 28/02* (2006.01)
*H04M 1/60* (2006.01)

(52) U.S. Cl.
CPC ............ *G06K 9/00845* (2013.01); *B60K 28/02* (2013.01); *B60W 50/12* (2013.01); *B60R 2300/8006* (2013.01); *H04M 1/6075* (2013.01)

(58) Field of Classification Search
CPC ... H04M 1/6075; B60K 28/02; B60K 28/066; B60R 2300/8006; B60W 50/12; G06K 9/00832; G06K 9/00845
USPC ..................... 348/148; 701/36; 340/439, 576; 180/272; 382/104
See application file for complete search history.

(56) References Cited

U.S. PATENT DOCUMENTS

| | | | | |
|---|---|---|---|---|
| 8,744,642 | B2 * | 6/2014 | Nemat-Nasser et al. | 701/1 |
| 9,135,803 | B1 * | 9/2015 | Fields | G08B 21/02 |
| 2011/0105082 | A1 * | 5/2011 | Haley | 455/411 |
| 2014/0019167 | A1 * | 1/2014 | Cheng et al. | 705/4 |
| 2014/0172467 | A1 * | 6/2014 | He et al. | 705/4 |
| 2014/0313309 | A1 * | 10/2014 | Matsuo | 348/78 |
| 2015/0019266 | A1 * | 1/2015 | Stempora | 705/4 |
| 2015/0258997 | A1 * | 9/2015 | Nilsson | B60W 40/09 340/576 |
| 2015/0314681 | A1 * | 11/2015 | Riley, Sr. | B60K 28/066 340/576 |

OTHER PUBLICATIONS

Fletcher et al.; "Driver Inattention Detection based on Eye Gaze-Road Event Correlation"; Jun. 2009; The International Journal of Robotics Research; vol. 28, No. 6; pp. 774-801.*
You et al.; "CarSafe App: Alerting Drowsy and Distracted Drivers using Dual Cameras on Smartphones"; Jun. 25-28, 2013; Mobisys '13; ACM 978-1-4503-1672-9/13/06.*

* cited by examiner

*Primary Examiner* — John Villecco

(57) ABSTRACT

A device in an automobile includes a camera that takes images of drivers while they are driving. It detects and reports when eyes are not on the road for longer than a glance with automated image processing. It also reports how much the car is driven, by whom, when, where, carrying what load, at what speed compared to the speed limit, with what pattern of hard breaking or hard cornering, whether the driver looked into the blind spot before changing lanes, and whether the driver allowed their phone to enter a restricted state while driving. The device may be built in or retrofit. The retrofit device can detect if it is depowered or removed from the vehicle and report this to the insurance company, rental company, parents, and employers.

20 Claims, 2 Drawing Sheets

TELEPROCTOR REPORTS USE OF A VEHICLE AND RESTRICTS FUNCTIONS OF DRIVERS PHONE

This application claims priority from U.S. provisional applications 61/693,079 filed Aug. 24, 2012 and 61/728,763 filed Nov. 20, 2012.

BACKGROUND

Auto insurance companies, auto rental companies, parents, and employers would like to know how much a vehicle is driven, by whom, when, where, at what speed compared to the speed limit, carrying what load, and whether any of the drivers take their eyes off the road for too long or engage in other risky driving behaviors. Parents and employers would like reports on some of these items promptly upon occurrence. All four want assurance that the monitoring cannot be avoided by subterfuge.

Insurance companies and auto rental companies would offer lower rates or trip-by-trip discounts where they are assured that technology is in place to report the above information without possibility of avoidance. To be sure they qualify for lower rates, drivers would like immediate feedback on actions that might preclude lower rates.

To reduce annoyance, avoid temptation, reduce risk, and show the vehicle owner and/or insurance company that they are a safe driver, some drivers would like their phones to automatically detect when they are driving and, at those times, not ring with an incoming call unless the caller believes the call is important enough to be put though while the driver is driving, delay the ring of an incoming text until the vehicle is stopped, and display only a simple user interface that can be understood with quick glances. For drivers who do not use a cell phone, they would be happy to receive lower insurance rates by accepting a system that proves to the insurance company that they never hold a cell phone while driving,

SUMMARY

In the prior art, insurance companies incentivize customers to install in their autos cameras that take images of drivers while they are driving and send the images to the insurance companies for human review. An improved device to do this and more, called a teleproctor, is described. Detection and reporting of when eyes are not on the road for longer than a glance is automated with image processing. The device also reports how much the car is driven, by whom, when, where, carrying what load, at what speed compared to the speed limit, with what pattern of hard breaking or hard cornering, whether the driver looked into the blind spot before changing lanes, and whether the driver allowed their phone to enter a restricted state while driving. Reports of selected events can be sent to parents or employers promptly upon occurrence. Importantly, the removable retrofit device can detect if it is depowered or removed from the vehicle and report this to the insurance company, rental company, parents, and employers.

Systems to provide the monitoring and reporting and screening of calls can be retrofit to existing vehicles at low cost. If there is sufficient demand for the desired features, auto manufacturers will pre-install the hardware components to run software loaded by insurance companies, rental companies, parents, and employers.

The teleproctor is installed in the vehicle by the insured or built into a new car. Installation for retrofit requires no skills. It is quick and easy and gives immediate feedback whether successful or unsuccessful. The teleproctor merely needs to be adhered to the dashboard or the windshield or the rear-view-mirror at a spot where the driver can see it and either a power wire is then plugged into a power source, such as a USB port or a cigarette lighter receptacle, or the teleproctor includes a photovoltaic panel that charges its battery. To verify correct set up, the teleproctor sends a message via a radio network to a server and, when it receives an acknowledgment, beeps and flashes a green light.

The teleproctor collects data and wirelessly sends it to a central repository from which data is provided to the insurance company and/or the car owner (rental company, parents, or employer). The teleproctor can be set to give auditory reports and/or visual reports to the driver whenever it reports to the insurance company that the driver was exceeding the speed limit by more than a threshold or had eyes looking away from the road for too long while the car is moving or other detected behaviors, bad or good.

To report its data, the teleproctor can include wireless network communications circuitry and a network account can be maintained for transmission, like with the General Motors Onstar system. Alternatively, the teleproctor can send the data to a pre-identified mobile phone via Bluetooth or WiFi when that phone is in the vehicle and the phone runs an app that forwards the data in SMS messages or via internet to the data repository. A vehicle owner or insurance company can instruct the repository to forward selected data events immediately upon receipt.

The teleproctor provides data to answer these questions:
1. How many minutes per week is the car driven? on which risky roads at what times?
2. In each minute, what was the vehicle speed and what is the speed limit as shown by a map for that location?
3. In each minute, was the car driven by the primary listed driver? The number 2 listed driver? Number 3, etc.? A non-listed driver?
4. In which minutes and for how long each time did the driver take his or her eyes off the road?
5. Did the driver brake hard? corner hard? look in the blind spot before changing lanes?
6. While driving, did the driver prevent their phone from automatically entering a restricted mode to reduce distractions?
7. For each trip, what was the load added to the vehicle?
8. Where is the car now, what are current images of the driver or driver's seat, and what are current sounds?
9. Was the teleproctor removed from the vehicle or depowered?

Although software in the teleproctor is sophisticated, the hardware cost of each teleproctor is low. Most of the hardware is already present in many new vehicles, such as the GM Onstar system. The labor cost of retrofit installation is insignificant because each vehicle owner can do it themselves without expert guidance or review. The eye direction recognition software need not be so effective that it detects every too long glance away from the road. It only needs to detect enough of the too long glances away that the driver is deterred from risky behavior and there is no way the driver can consistently avoid detection.

Similarly, the most important part of the subterfuge detection system—detecting removal of the retrofit teleproctor from the vehicle—requires no extra hardware, merely sophisticated software. This component of the teleproctor can be a valuable component to add to any device with radio circuits where detection of removal is important.

A. EYES AND FACIAL RECOGNITION

Figure 1:
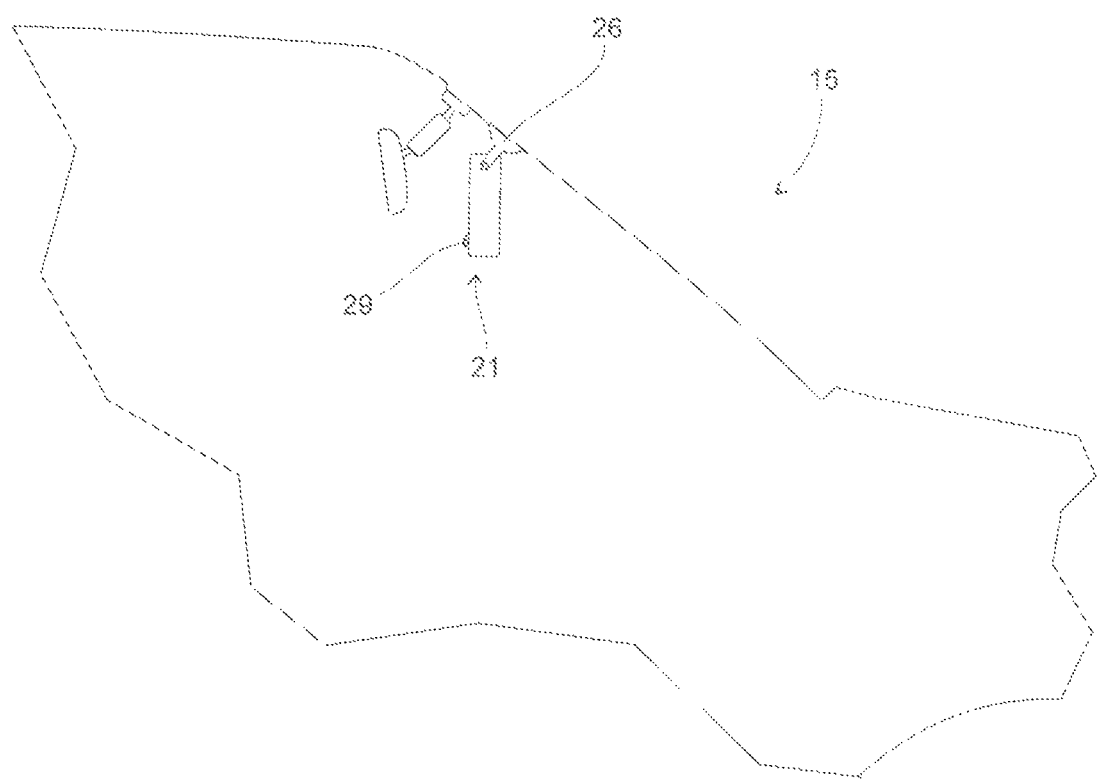
FIG. 1 shows a passenger vehicle with a teleproctor adhered to the windshield.
Figure 2:
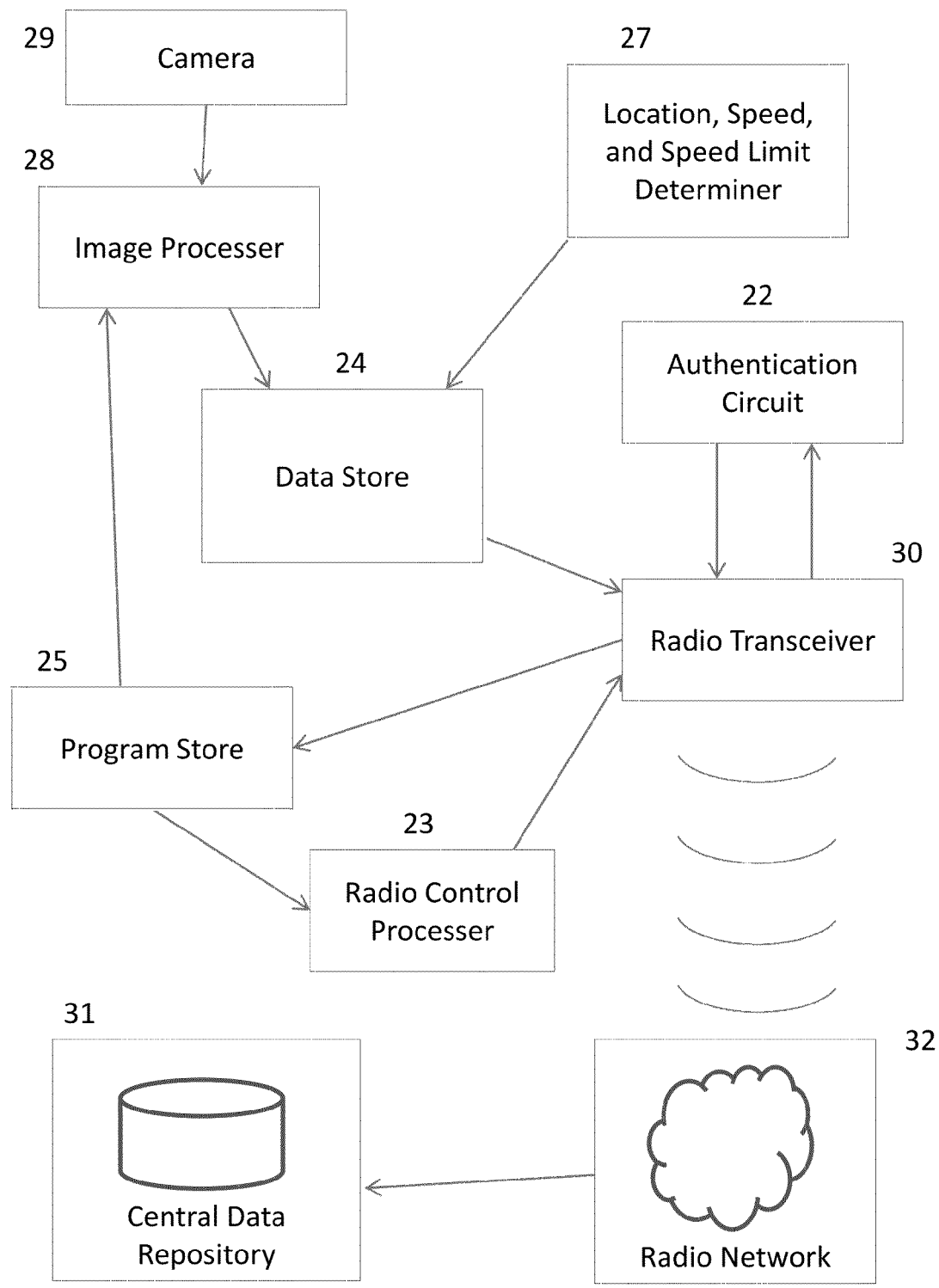
FIG. 2 shows the circuit components of a teleproctor.

As shown in FIG. 1, the teleproctor 21 includes a camera 29 mounted on a base that includes electronic circuitry. The base need not be larger than a small mobile phone. In new vehicles, the base may be built into the dashboard. The camera housing includes an infra-red light emitter that shines light not visible to humans toward the camera's field of view. The camera pixel sensors detect both visible and infra-red light.

For retrofit, as shown in FIG. 1, the base may be adhered to the windshield 15 near the rear view mirror. Alternatively, it may be adhered to the dashboard or affixed to the mirror. For retrofit, it has a wire that leads to a plug for a USB port (5 volts) or to a 12 volt outlet (cigarette lighter socket) or it includes a solar photovoltaic panel that charges a battery.

The teleproctor includes an image processor circuit 28 which may be programmed to use image recognition to determine such events as:
 (a) Is the camera pointed at a face recognized as a pre-listed driver?
 (b) While the car is moving faster than a threshold, are the eyes looking away from the road too long for a glance in another direction?
 (c) Did the head turn in a manner typical of checking the blind spot?

The teleproctor 21 is programmed to learn the necessary recognition details automatically after the teleproctor is installed. Facial image and eye position recognition methods are well known.

If the camera aim is changed so that it is not pointed at a human face and the car is moving faster than a threshold, this fact is reported to the driver and to the owner and/or insurance company.

When the teleproctor is installed, a first listed driver sits in the driver's seat and adjusts the camera angle to point at his or her eyes. The driver clicks a button, then looks straight ahead at the road as if driving. Three seconds after the button was clicked, the teleproctor captures an image to save data characteristics of this face and these eyes as the first listed driver in correct driving position. The user interface for the teleproctor can be via a mobile phone or laptop or tablet computer with a Bluetooth or WiFi or similar connection. Data to recognize each other pre-listed driver—number 2, number 3, etc.—is also stored in this way the first time each of them drives. The teleproctor then determines when it is looking at one of these drivers and can report the driver's identity with little data transmitted.

If a face is not recognized when the vehicle is moving, the teleproctor reports this fact to the driver. The driver will be reported to the owner and/or insurance company as a not-pre-listed driver unless the system is commanded to store the new facial data as the image of a newly listed driver. The image of each face used to train the system is transmitted to the owner and/or insurance company and stored in their records for human review if and when necessary. If a person changes their facial appearance, by changing their glasses or other features, they simply reprogram the teleproctor to store their new facial data characteristics. The teleproctor can keep two or more stored sets of facial data for each driver, such as with dark glasses or clear glasses or with a hat, etc.

Instead of storing facial recognition data in the teleproctor, the entire original images may be uploaded to a central server where the facial recognition processing is done. Then, each time the vehicle starts moving from a stop long enough to change drivers, an image is taken and uploaded for facial recognition.

In addition to a facial recognition system for determining who is driving, the teleproctor includes components for eye direction determination, such as by identifying the dark parts of eyes as contrasted against whites of the eyes and computing metrics of the dark parts of eyes and the whites on each side of the dark parts. Any method for making these computations may be used. A suitable method for making these computations is in Appendix A. When the driver slightly changes position while the vehicle is moving, the image processor may update the looking-at-the-road eye position data set for the driver by assuming that an eye position that is steady while the car is moving with only short glances in other directions should be the basis for updating the data set.

When the eye direction data changes significantly from the looking-at-the-road data set and then returns to the looking-at-the-road data set within a window of time, the system concludes that the eyes were not looking at the road. If the dark parts move to the side and the eye metrics change a large amount, the head has turned, such as to check the blind spot.

For optimal processing for each of eye direction recognition and facial recognition, the effective brightness of the captured data in the visible and infra-red spectra may be adjusted independently. In addition, the intensity of infra-red light emitted by the teleproctor to illuminate the face may be adjusted independently for each data set, giving a total of three possible brightness adjustments for each of eye direction recognition and facial recognition purposes. For example, for eye direction determination when the driver is wearing dark glasses, the three brightnesses will be adjusted for optimal distinction between the dark parts and whites of the eyes as seen through the dark glasses. Brightness adjustments suitable for use with dark glasses will typically be too bright for recognition of other facial features.

B. COLLECTING ADDITIONAL DATA

Location, Speed, and Speed Limit

The teleproctor includes a determiner of location, speed, and speed limit 27 which places into the data store 24 location data and speed relative to the local speed limit. For a built-in teleproctor, the location, speed, and speed limit determiner 27 may get this data from a GPS with map circuit in the vehicle. In the retrofit teleproctor, the location, speed, and speed limit determiner 27 includes a GPS circuit and a stored digital map with speed limits for each location. The map is periodically updated by download through the radio transceiver 30. The teleproctor saves in the data store 24 the location, speed, and speed limit data for reporting.

Acceleration.

The teleproctor includes at least two accelerometers. An acceleration data processor can determine when lane changes are made and the image recognition processor can determine whether the driver first looked in the blind spot. If the teleproctor is built into the vehicle, it can be coupled to data sources from the vehicle such as whether a turn signal was activated before changing lanes and braking or turning data. The acceleration data processor can determine when the driver causes hard braking or cornering or speeding up. A summary of these determinations can be uploaded to the data repository for review by the insurance company or owner.

Load.

Rental companies would like to know how much load their vehicle is carrying on each trip as a gauge of wear. This information can be used to set lower rates for people who carry light loads. Data from the accelerometers on hard acceleration, hard cornering and hard braking is also of interest to these companies because it increases tire wear. Parents and employers would like to know when the vehicle is being used to carry extra passengers.

A load computation can be implemented with data showing power or fuel consumption provided by engine sensors. The built-in teleproctor receives input from the vehicle engine computer. When the engine power output is high, either the vehicle is going up a hill or it is accelerating. Using the speed determining circuits, these two factors can be computationally separated. By comparing the power output to change in speed and factoring out any hill incline, the load the vehicle is carrying can be computed. Another method to distinguish between climbing a hill and speeding up uses a direction of gravity+acceleration sensor. By comparing the output of this sensor to change in speed, these two factors can be separated.

A more direct method for obtaining load data to report is to add strain gauges to one or more suspension springs of the vehicle. It may be a tiny strain gauge that directly senses strain in the metal of the spring or it may be a distance sensor that senses the distance that the spring is collapsed overall. Placing the gauge on only one spring, a rear spring, may be sufficiently accurate. A wire is run from the strain gauge to the teleproctor or to the vehicle's computer which passes the data on to the teleproctor. Of course, the teleproctor circuits may be built into the vehicle's computer circuits, with only the camera and other sensors being outside the vehicle computer circuits.

C. REPORTING DRIVING BEHAVIOR TO THE DRIVER AND THE INSURANCE COMPANY AND/OR VEHICLE OWNER

Collected data for each trip is stored in a data store 24 shown in FIG. 1. Periodically, a radio control processor 23 commands the radio transceiver 30 to send new data in the data store 24 to a central repository 31 where it is repackaged and supplied to the insurance companies and/or car owner. The transmission route may go directly from a wireless network transmitter built into the teleproctor or the vehicle, in which case an account for the teleproctor is maintained in the radio network, or it may pass via Bluetooth or WiFi to a phone or mobile wireless internet device in the car which acts as the first link in a radio network 32.

Any programmable "smart" phone or other mobile wireless network device can be programmed with an "app" to perform this function automatically without the device owner taking any action other than leaving the device and the app turned on whenever the device is in the vehicle. The device automatically detects the Bluetooth or WiFi signal from the teleproctor and connects to it. The teleproctor and app together then determine how often a data bundle is uploaded through the device. For example, if the device is in an area with poor reception, the uploads may be delayed. This uploading of the data can be programmed to happen the first occasion after a designated time each day that one of the designated device with Bluetooth or WiFi is in the car and the car is turned on, or other occasions. It can be programmed to happen immediately when certain events are detected or upon request from the system server 31.

The teleproctor can be programmed so that, when a specified number of events of not looking at the road for longer than a threshold occur within a specified window of time, a report is immediately sent via the radio network. Similarly, it can be programmed to immediately send a report when speed over the speed limit is maintained for longer than a threshold amount of time or any other event. If the teleproctor detects extreme deceleration suggestive of an accident, or upon request from the system server, it can transmit images from the teleproctor and sounds collected by a microphone in the teleproctor or the phone for a period of time.

So that the actions of the image processor and the radio control processor can be updated, they are each controlled by programs stored in a rewritable program store 25 which can be rewritten by download through the radio network 32 and loaded into the program store 25.

The teleproctor can upload data showing:
1. the start and stop (longer than a threshold such as 4 minutes) times of all vehicle movement,
2. coordinates at each start or stop time,
3. coordinates at each turn relative to mapped roads to show each leg of the route taken on each trip,
4. number of minutes in each leg,
5. number of minutes in each leg that the vehicle speed exceeded the speed limit by more than a threshold,
6. any hard breaking or cornering or extreme deceleration,
7. amount of load (or estimated number of passengers) carried on each trip,
8. number of times in each leg that the driver turned their eyes away from the "looking at the road" direction for more than a threshold duration and by how many tenths of seconds the threshold was exceeded, both a maximum and an average, and
9. whether the driver prevented their phone from automatically entering restricted mode controlled by the teleproctor.

The teleproctor can be set to play an auditory message to the driver through a speaker in the teleproctor or the driver's phone and/or present a visual message to the driver in a display for the driver whenever speeding or eyes off the road or other events are reported to the insurance company. With each message to the driver, the teleproctor can tell the driver how much money the driver lost on insurance costs due to speeding or eyes off the road, etc.

Data elements 1-7 above can be reported without adding a teleproctor camera into the vehicle. Some vehicles and mobile telephones already have the required hardware. All that is required is software to be downloaded into them to work as follows. A processor receives vehicle speed from the vehicle, from either a speedometer or a GPS circuit in the vehicle. The processor receives a speed limit from the GPS and a stored map. The processor may be in the on-board vehicle electronics associated with the GPS or in a mobile telephone that communicates with the on-board vehicle electronics via Bluetooth or WiFi. The phone provides acceleration data. The mobile telephone runs an app that receives the data and forwards it to the remote parties.

D. LEVELS OF RESTRICTED FUNCTIONALITY OF DRIVERS' PHONES WHILE DRIVING

As described above, each phone in the vehicle running an appropriate app can automatically connect to the teleproctor for bi-directional communication when the phone is in the vehicle. By facial recognition, the teleproctor can know which listed driver is driving the vehicle. With this information and prior cooperation by the usual drivers of the vehicle to load apps in their phones and list a phone identifier with the teleproctor, the teleproctor can advise the driver's phone that it should enter a restricted mode when the vehicle is moving. The usual drivers' phones are each identified to the teleproctor when they first connect to it. Then, with the phone owner's acceptance by user input to load the app, the app will put the phone in a restricted mode whenever the teleproctor advises the phone that its owner is in the driver's seat and the vehicle is moving. If the driver's usual phone is not running the app to allow restriction, this suspicious circumstance can be reported to the vehicle owner or insurance company which can use this information to set rates or rules.

An optimal form of functionality restriction might block all text message alerts or display and block all reading, writing, or other user interactions with a display while moving, but, to accommodate emergencies, it should not block all voice communications while moving. Examples of restrictions that can be implemented in the phone include 1. Defer until the vehicle stops the playing of text ring sounds;
2. Block displays to read text or to receive text input at the keypad;
3. Block display of typical web pages which require focused attention to glean information, allowing only simple displays;
4. For incoming calls, play a message to the caller that the callee is driving and ask whether the call is important enough to put through; the called phone would ring only if the caller says "yes" or presses "1".
5. When the vehicle takes certain actions, such as acceleration or breaking or sharp turns, suspend voice calls and play an explanatory tone or message to the remote party.
6. When the automobile's risk alerting forward looking radar senses a risk or the GPS circuit with map indicates that a zone of high risk (such as certain intersections) is being entered, the teleproctor instructs the phone to play an alert sound into any on-going telephone conversation or suspend the call so that both parties know the driver needs to pay attention.

In restricted mode, all screen displays are so simple that a viewer can glean all available information with just a glance—no text beyond a few words to read, no large sets of items to choose from.

Level of attention required for driving can be approximated with the accelerometers in the teleproctor. The teleproctor can advise the driver's phone to enter a more restricted state when the vehicle is speeding up or slowing down or turning or quickly changing lanes or recently has been doing so. If it is built into the vehicle, the teleproctor can receive inputs from various vehicle sensors that suggest when more attention is required for driving. At these times, the outgoing voice signal or the incoming voice signal or both can be interrupted or suspended (and perhaps replaced with a sound or recorded words) to reduce distraction for the driver and inform the other party to the conversation that the driver needs to pay attention to driving at this time.

There can be multiple levels of restriction based on time of day or location on a map in memory based on GPS location or other factors. A restriction might be to stop the handset speaker from working and require use of a headset speaker.

Conversations with a passenger in a car present less of a distraction than telephone conversations because the remote telephone conversant does not know what else the driver is doing simultaneously and what the driver is seeing, while the passenger knows these things. The passenger understands what is happening when the driver pauses to concentrate on driving. The concentration demands for a telephone conversation can be reduced and made more like the demands for conversation with a passenger by periodically playing a beep or other signal to the remote telephone party to remind them that the person they are talking to is also driving.

The app running in the driver's phone can be programmed so that, when a caller calls while the phone is in a restricted state, before the phone rings, a message is played to the caller saying: "The person you are calling is driving. If this call is important enough to interrupt that person while driving, press 1 or say yes." The called phone would only ring if the caller presses 1 or says yes. Otherwise, the call is rerouted to voice mail.

As described above, for independent adult drivers, restricting phones that are moving to block texting and display interactions but only temporarily block voice communications while also accelerating may be optimal. However, for children, or children and certain employees, the parent or employer may prefer a greater level of restriction. In this system, the phone owner can have a password that allows greater restriction to be placed on the phone. Here are examples of possible voice call restrictions that may be preferred in these situations for outgoing calls.

(1) Only calls to 911 or any other listed emergency number are allowed.
(2) Phone numbers of family members are listed with the app and only calls to these numbers are put through.
(3) Speed dial calls are allowed but not calls requiring pressing more than 3 keys.
(4) Voice calls to other than listed emergency numbers are cut off after 3 minutes.

Here are examples of possible restrictions for incoming calls.

(5) The likely source phone numbers of family members are listed with the app and only calls from these numbers are put through.
(6) Voice calls from those listed family member numbers are cut off after 3 minutes.

E. AVOIDING POSSIBLE SUBTERFUGE

For the system to be valuable to insurance companies and vehicle rental companies, there must be no way to defeat it that would keep low insurance rates or rental rates in place when they should not be kept in place. Parents and employers have similar concerns. Subterfuges that might be attempted include:

1. Unplug or Remove the Teleproctor for Some Vehicle Trips.

The teleproctor includes a rechargeable battery that keeps it working for a length of time after it is depowered. In versions that do not include photovoltaic charging of the battery, when power to the teleproctor is lost, to determine whether the loss is due to a proper switch off of vehicle power or improper unplugging or removal of a power fuse, the teleproctor sends a radio ping out the power wire and measures the radio echo signature by a process described below.

If the echo signature shows that power was lost due to vehicle power switch off, the teleproctor takes no action other than going into its normal sleep mode. If the echo signature shows that the teleproctor is unplugged or a fuse is removed, whether accidently or otherwise, it plays an auditory alert warning to plug it back in. If it is not soon plugged in to the same vehicle as determined by the echo signature methods described below, the teleproctor reports this fact to the insurance company and/or owner.

To determine the cause of depowering, the teleproctor includes a circuit that captures and records a radio-echo signature of the power source and its connections. Using its radio transmitter, which it has for Bluetooth or WiFi communication with the phone or for wide area data network communication more directly to a server, the teleproctor emits a ping or series of pings into the power wire. Using its radio receiver, the teleproctor records a signature of the echo to obtain a radio echo signature of the vehicle electronics.

The power wire echo will be different if the power source is a 12 volt to 5 volt converter such as for USB receptacles rather than a 12 volt source such as from a cigarette lighter. It may also be affected by plugging other electronic devices into the vehicle. These changes can be distinguished as not material changes because the echo will be vastly different if the teleproctor is left unplugged or a fuse is removed or blown.

With known signature processing techniques, the echo data set may be reduced to a small but distinctive data set known as a signature hash. The algorithm for computing the hash is developed by collecting full signature data sets for many different vehicles and power supplies and developing the algorithm to make the hash data set optimally small while still distinguishing between the plugged and unplugged or no fuse conditions in all cases, no matter what else may be plugged in.

Every time the retrofit teleproctor is powered, whether from turning on vehicle power or from unplugging and then plugging back in, a total vehicle radio echo signature is obtained. For this, the radio echo signature is taken using the teleproctor's antenna for both broadcast and reception to obtain a signature of the entire vehicle, with a major factor being the shape of and relationship to all metal in the vehicle and a very minor factor being a change in the configuration of what's plugged into the vehicle's power and where it's plugged in. This allows users to unplug the retrofit teleproctor, make changes to what's plugged in and where, and then plug in the retrofit teleproctor again without a problem. If the total vehicle radio echo signature hash is the same as before, no alert is sent to the insurance company. For the built in teleproctor, no total vehicle radio echo signature capability is required.

The algorithm for computing the hash for the vehicle radio echo signature is developed by collecting full signature data sets for many different vehicles and developing the algorithm to make the hash data set optimally small while still distinguishing between as many vehicle models as possible and never computing two different hashes for the same vehicle even if the teleproctor's location within the vehicle is moved a small enough amount to have no adverse effect on the functioning of the teleproctor.

A driver might, while the vehicle power is off, unplug the retrofit teleproctor, leave it unplugged for some trips, and then plug it back into the same vehicle. To prevent this subterfuge, the back-up battery has enough power to last several days and, while depowered in sleep mode, the teleproctor wakes up periodically, about every 3 hours, and queries the GPS to determine its location. If the location is not the same as where the teleproctor went to sleep, the insurance company and/or owner is notified.

A driver might, while the vehicle power is off, unplug the retrofit teleproctor and remove it from the vehicle, leaving it in the same location as where the teleproctor went to sleep while the vehicle drives away. To prevent this subterfuge, the back-up battery has enough power to last several days and, while depowered in sleep mode, the teleproctor wakes up periodically, about every 3 hours, and takes a total vehicle radio echo to determine the radio reflection characteristics of its surroundings and computes a hash. If the computed hash is not the same as for the vehicle in which the teleproctor was installed, the insurance company and/or owner is notified.

For new cars with a built in teleproctor, the total vehicle echo signature never needs to be taken because the teleproctor cannot easily be removed. For retrofit teleproctors, the original total vehicle echo signature hashes are computed when the teleproctor is initially set up and recomputed if it is set up again.

2. Point the Camera at a Manikin or Mask or Image of a Human Face.

The teleproctor is programmed to report that the data is likely wrong if the eye direction data does not change with glances away from the road as much as is minimally human.

3. Point the Camera at a Passenger.

Unless the passenger is looking at the road as much as the driver should be, this will not achieve the driver's objective—the glances away from the road by a passenger will be too long. If the driver points the camera at a passenger who is instructed to stare intently at the road ahead, the face will not be recognized as a covered driver unless the driver attempted to defraud the employer or insurance company by claiming that the face on which the system was trained is the driver's face, but this would be easily caught by a human looking at the photo of the face that was uploaded when the system was trained on that face.

Also, if the camera is not moved from its location in front of the driver, the angle of looking at the passenger will be too oblique and this will be automatically detectable by the image processor. If the camera is moved from its proper location, the echo signature of the total vehicle will be detectably different.

4. Install a Bootlegged Teleproctor.

It is necessary to include a method for the data compiling system 31 to authenticate each teleproctor. Otherwise, sociopathic entrepreneurs could make and sell bootlegged teleproctors that will give false and prettied-up data on use of the vehicle. The authentication method need not be strong. It only needs to be strong enough to make it expensive to make and sell an unauthorized teleproctor that will work adequately to go undetected more than about half of the time.

Crypto-authenticating chips are well known. They are designed to receive as input a first data string and, in response, output a second data string. When both data strings are processed together with a secret key, the result will show the second data string to have been produced by the crypto-authenticating chip or not. The second string cannot be inexpensively determined from knowing the first string without having the key. The contents of the authenticating chip cannot be read and duplicated because a fusible link was burned after manufacture.

The data compilation server 31 sends a first data string to the teleproctor mounted in the vehicle which replies with a second data string from a crypto-authentication circuit 22 included in the teleproctor. If the data compilation server determines that the strings do not match with the key, the data is so annotated.

Each teleproctor sends to the data compilation server 31 an identifier for use to determine which key should be used. The identifier may be the teleproctor's mobile number in the network or it may be a separate identifier stored in and sent by the authentication circuit 22 (e.g., a serial number).

An alternative design for an authentication circuit uses a clock in the teleproctor that is synchronized with a clock in the central server to periodically change a data string that it sends to the server. Each new data string must match what is expected to achieve authentication. Other authentication circuits are known and may be used.

Although teleproctors require approved authentication circuits 22 to be built in by licensed manufacturers to avoid bootlegging of devices that report false information, the authentic teleproctors can be sold freely though all channels of trade and installed by anyone.

5. Load a Bootlegged Program into the Teleproctor.

The server that checks for the authentication chip is the only component that is permitted to load an updated program into the teleproctor. The authentication chip is programmed to also check the credentials of the server and insure that no other source can supply an updated program.

6. Block the Driver's Phone from Connecting to the Teleproctor.

The image recognition system identifies who is driving. If that person's listed phone is turned off or not running the app such that the teleproctor cannot connect to it, this is reported, with adverse consequences for the driver.

7. Carry a Non-Listed Phone as Well as a Listed Phone.

The image recognition system identifies who is driving. If that person's listed phone is in the vehicle and running the app, the phone will enter a restricted state as appropriate. If the driver uses a second, non-listed phone, it will not be in a restricted state, but the eye direction monitoring system will still be watching the eyes and reporting too much eyes-off-the-road behavior. Whenever the eyes are off the road too long, the system can upload an image of the driver's face and upper body for possible human or automated review.

APPENDIX A

Method of Computing Eye Direction Metrics

1. Find the pixels within the top half of the frame and the center half of the frame that are darkest and set this value as the lightness threshold. Raise the lightness threshold until two groups are found, a distance apart within the range of possible pupil distances and roughly horizontal to each other. Looking only at pixels contiguous with either group, incrementally raise the lightness threshold and count the number of pixels added at each increment until the longest diameter of each group reaches a maximum of possible pupil diameters. Separately for each group, identify the lightness increment that added the smallest number of pixels where the longest diameter is within a range of possible diameters. If the longest diameter of each group is different, adjust the increment one unit lighter for the smaller group or one unit darker for the larger group or both until the longest diameter of each group is the same. This is the "pupil diameter". The boundary of each group defines each "pupil".

2. Compute a center of each pupil and define a line between the centers as "horizontal".

3. At 35 degrees to the horizontal line, look at the lightness of each pixel in each of four directions from each pupil (eight "rays") to a distance from each pupil equal to half the pupil diameter. Raise the lightness threshold incrementally and count the number of pixels added to each ray by each increment until no more pixels are added by an increment. For each of the eight rays, the lightness increment that added the largest number of pixels defines the lightness of "the whites" of the eyes for that ray, and the total number of pixels added to this point for each ray is the "whites pixel count" along that ray.

4. For each eye, the whites pixel count for each of the four rays constitutes a four dimensional "eye direction metric". When the eye direction metrics for the two eyes change by more than a threshold, the eyes are "not on the road". The threshold is developed empirically.

The invention claimed is:

1. A system for use in a vehicle to reduce traffic accidents, comprising:
   (a) a camera adapted for installation in a vehicle aimed at a typical location of a driver;
   (b) coupled to the camera, an image processor circuit that identifies human eyes, records a usual appearance of eyes of a driver in an eyes-on-the-road position, and determines when the eyes are diverted to a position other than the eyes-on-the-road position by determining ellipticity of dark parts of eyes contrasted with surrounding whites of eyes;
   (c) coupled to the image processor circuit, a radio communications circuit with an antenna adapted for communications to a wide area radio network;
   (d) coupled to the radio communications circuit, a speed determining circuit that determines speed of movement of the vehicle; and
   (e) means for the components to report to a server across the wide area radio network data regarding incidents of eyes-off-the-road by the driver while the vehicle is moving faster than a threshold.

2. The system of claim 1 wherein the image processor circuit, to determine when the eyes are diverted to a position other than the eyes-on-the-road position, also employs a method of determining width of whites of eyes in at least one direction from dark parts of eyes to a portion of the image that is discontinuously less white than the whites.

3. The system of claim 1 further comprising an infra-red light emitter mounted near the camera aimed to direct infra-red light onto the field of view of the camera.

4. The system of claim 3 wherein the camera captures images in infra-red light as well as visible light.

5. The system of claim 4 wherein the image processor includes a circuit that adjusts at least one of brightness of emissions of infra-red light, sensitivity of capture of infra-red images, and sensitivity of capture of visible light images to optimize utility of the captured images.

6. The system of claim 4 wherein the image processor includes a circuit that adjusts at least two of brightness of emissions of infra-red light, sensitivity of capture of infra-red images, and sensitivity of capture of visible light images to optimize utility of the captured images.

7. The system of claim 1 wherein the speed determining circuit is a GPS circuit.

8. The system of claim 1 wherein speed determining circuit receives speed data input from one or more sensors in the vehicle that detect speed and report detected speed to the system.

9. The system of claim 1 further comprising, coupled to the radio communications circuit, an authenticating circuit adapted for authenticating the communications circuit via the radio network to a remote server coupled to the radio network.

10. The system of claim 9 wherein the authenticating circuit is a crypto-authenticating circuit that receives as input from the radio network a first data string and, in response, outputs a second data string to the radio network, which second data string cannot be determined from knowing the first data string without having a key.

11. The system of claim 1 where the components are assembled into a device adapted for retrofit into a pre-existing automobile.

12. The system of claim 1 where the components are built into a new vehicle as the vehicle is constructed.

13. The system of claim 1 further comprising a rechargeable battery power supply coupled to a solar cell that charges the battery.

14. The system of claim 1 wherein the image processor includes a circuit that, by image analysis, identifies head turning and determines whether the head turned before a lane change.

15. A method for determining when a driver in a driver's seat in a vehicle is not sufficiently keeping the driver's eyes on the road, comprising:
   a. having a camera mounted in front of the driver's seat and aimed at where a driver's face is positioned while driving, coupled to an image processor and a speed determining circuit, the method comprising:

b. receiving images from the camera and processing the images in the image processor to identify a pupil object as a boundary between a set of pixels that are relatively dark compared to surrounding pixels where the boundary is a complete ellipse having an ellipticity less than a maximum and a length both greater than a minimum and less than a maximum;

c. computing and saving a set of ellipticity values over time for the pupil object, and, for each ellipticity value, obtaining a speed value from the speed determining circuit and associating the values;

d. selecting ellipticity values that are associated with a speed value above a threshold, classifying selected ellipticity values that are within a range close together in value and constitute a majority of the values as eyes-on-the-road ellipticity values, and classifying selected ellipticity values that are outside the range as eyes-not-on-the-road values.

16. A system for use in a vehicle to reduce traffic accidents, comprising:

(a) a camera adapted for installation in a vehicle aimed at a typical location of a driver;

(b) coupled to the camera, an image processor circuit that identifies human eyes, records a usual appearance of eyes of a driver in an eyes-on-the-road position, and determines when the eyes are diverted to a position other than the eyes-on-the-road position by determining width of whites of eyes in at least one direction from dark parts of eyes to a portion of the image that is discontinuously less white than the whites;

(c) coupled to the image processor circuit, a radio communications circuit with an antenna adapted for communications to a wide area radio network;

(d) coupled to the radio communications circuit, a speed determining circuit that determines speed of movement of the vehicle; and (e) means for the components to report to a server across the wide area radio network data regarding, incidents of eyes-off-the-road by the driver while the vehicle is moving faster than a threshold.

17. The system of claim 16 further comprising an infra-red light emitter mounted near the camera aimed to direct infra-red light onto the field of view of the camera.

18. The system of claim 16 wherein the camera captures images in infra-red light as well as visible light.

19. The system of claim 16 wherein the image processor includes a circuit that adjusts at least one of brightness of emissions of infra-red light, sensitivity of capture of infra-red images, and sensitivity of capture of visible light images to optimize utility of the captured images.

20. The system of claim 16 wherein the image processor includes a circuit that adjusts at least two of brightness of emissions of infra-red light, sensitivity of capture of infra-red images, and sensitivity of capture of visible light images to optimize utility of the captured images.

* * * * *